(12) United States Patent
Lee (10) Patent No.: US 12,407,038 B2
(45) Date of Patent: Sep. 2, 2025

(54) AIR COOLING TYPE BATTERY MODULE HAVING SEPARATE COOLING STRUCTURE FOR BATTERY CELL

(71) Applicant: LG ENERGY SOLUTION, LTD., Seoul (KR)

(72) Inventor: Tae-Gyu Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 515 days.

(21) Appl. No.: 17/921,796

(22) PCT Filed: Nov. 15, 2021

(86) PCT No.: PCT/KR2021/016672
§ 371 (c)(1),
(2) Date: Oct. 27, 2022

(87) PCT Pub. No.: WO2022/108278
PCT Pub. Date: May 27, 2022

(65) Prior Publication Data
US 2023/0352763 A1    Nov. 2, 2023

(30) Foreign Application Priority Data
Nov. 23, 2020 (KR) ........................ 10-2020-0157806

(51) Int. Cl.
*H01M 10/6551* (2014.01)
*H01M 10/613* (2014.01)
(Continued)

(52) U.S. Cl.
CPC ..... *H01M 10/6551* (2015.04); *H01M 10/613* (2015.04); *H01M 10/653* (2015.04);
(Continued)

(58) Field of Classification Search
CPC ............ H01M 50/253; H01M 50/209; H01M 50/213; H01M 50/207; H01M 50/267;
(Continued)

(56) References Cited

U.S. PATENT DOCUMENTS

2009/0297892 A1    12/2009   Ijaz et al.
2011/0223452 A1     9/2011   Yoshida et al.
(Continued)

FOREIGN PATENT DOCUMENTS

CN    102057519 A    5/2011
JP    2007-012486 A  1/2007
(Continued)

OTHER PUBLICATIONS

The extended European Search Report (EESR) dated Aug. 8, 2024, issued in corresponding EP Patent Application No. 21895046.7.
(Continued)

*Primary Examiner* — Christopher P Domone
(74) *Attorney, Agent, or Firm* — Morgan, Lewis & Bockius LLP (57) ABSTRACT

A battery module according to the present disclosure includes: cylindrical battery cells arranged in horizontal and vertical directions, with a top cap facing upward; a module case in which the cylindrical battery cells are accommodated; and cooling caps mounted on lower end portions of the cylindrical battery cells, wherein the cooling caps protrude below a lower end of the module case to contact cooling air in a lower portion of the module case, and protrude to have different heights for pre-determined zones according to positions of the cylindrical battery cells located inside the module case.

11 Claims, 11 Drawing Sheets

(51) Int. Cl.
  *H01M 10/653* (2014.01)
  *H01M 10/6561* (2014.01)
  *H01M 50/213* (2021.01)
  *H01M 50/289* (2021.01)

(52) U.S. Cl.
  CPC ..... *H01M 10/6561* (2015.04); *H01M 50/213* (2021.01); *H01M 50/289* (2021.01)

(58) Field of Classification Search
  CPC ............ H01M 50/238; H01M 50/147; H01M 50/148; H01M 50/152; H01M 50/15; H01M 50/184; H01M 50/186; H01M 10/613; H01M 10/617; B60L 50/64
  See application file for complete search history.

(56) References Cited

U.S. PATENT DOCUMENTS

| | | | |
|---|---|---|---|
| 2012/0055725 A1* | 3/2012 | Mizoguchi | H01M 10/625 180/68.5 |
| 2014/0178723 A1* | 6/2014 | Tsujioka | H01M 50/522 429/99 |
| 2016/0285140 A1 | 9/2016 | Kimura | |
| 2017/0352931 A1 | 12/2017 | Yoshida et al. | |
| 2019/0229384 A1 | 7/2019 | Tasiopoulos et al. | |
| 2020/0203686 A1 | 6/2020 | Park et al. | |
| 2021/0203019 A1 | 7/2021 | Yoon et al. | |

FOREIGN PATENT DOCUMENTS

| | | |
|---|---|---|
| JP | 2011-175896 A | 9/2011 |
| JP | 5057720 B2 | 10/2012 |
| JP | 2013-4468 A | 1/2013 |
| JP | 2019-129149 A | 8/2019 |
| JP | 6690553 B2 | 4/2020 |
| JP | 2020-95860 A | 6/2020 |
| KR | 10-1967824 B1 | 4/2019 |
| KR | 10-2019-0053124 A | 5/2019 |
| KR | 10-2020-0058955 A | 5/2020 |
| KR | 10-2020-0078220 A | 7/2020 |
| WO | 2013/021573 A1 | 2/2013 |

OTHER PUBLICATIONS

International Search Report (with partial translation) and Written Opinion dated Feb. 25, 2022, for corresponding International Patent Application No. PCT/KR2021/016672.

Office Action issued in corresponding Chinese Patent Application No. 202180035347.8 dated May 29, 2025.

* cited by examiner

AIR COOLING TYPE BATTERY MODULE HAVING SEPARATE COOLING STRUCTURE FOR BATTERY CELL

TECHNICAL FIELD

The present disclosure relates to cooling technology for a battery module, and more particularly, to a battery module to which a cooling structure is applied to reduce a temperature deviation of each battery cell and improve cooling efficiency during cooling using an air cooling method.

The present application claims priority to Korean Patent Application No. 10-2020-0157806 filed on Nov. 23, 2020 in the Republic of Korea, the entirety of which is incorporated herein by reference.

BACKGROUND ART

Secondary batteries refer to batteries that may be repeatedly charged and discharged unlike primary batteries that may not be recharged, and secondary batteries are used as power sources for energy storage systems (ESSs), electric vehicles (EVs), or hybrid vehicles (HEVs) as well as small high-tech electronic devices such as mobile phones, personal digital assistants (PDAs), and laptop computers.

Currently, sufficient power to drive an electric vehicle may not be obtained from only one lithium secondary battery (cell). In order to apply a secondary battery as an energy source for an electric vehicle, a battery module in which a plurality of lithium ion battery cells are connected in series and/or in parallel should be configured, the battery modules are typically connected in series, and a battery pack including a battery management system (BMS) for functionally maintaining the battery modules, a cooling system, a battery disconnection unit (BDU), an electrical wiring cable, etc. is configured.

A secondary battery cell generates heat during repeated charging and discharging. In this case, when the secondary battery cell is not cooled, a temperature continuously rises, thereby degrading the performance of the secondary battery cell and increasing the risk of firing or exploding the secondary battery cell. Accordingly, when a battery module is configured, cooling of secondary battery cells is the most important task.

Figure 1:
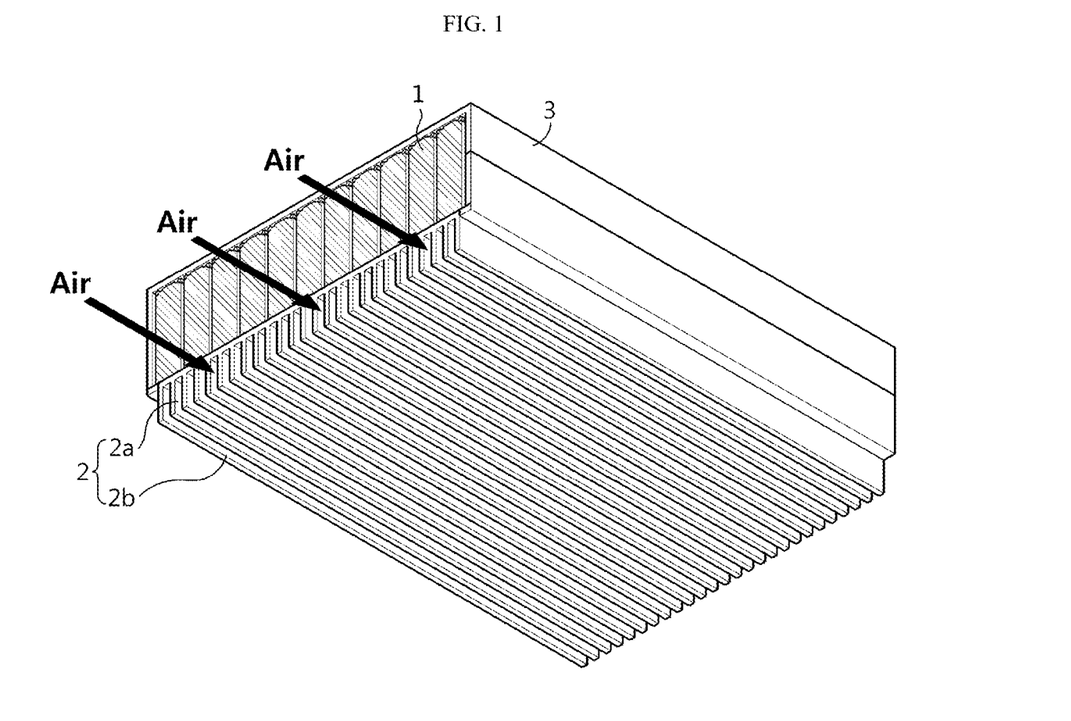
FIG. 1 is a view illustrating a cooling configuration of a battery module according to the related art.

As an example for cooling battery cells 1, there is a battery module in which a cooling plate 2 is applied to the bottom as shown in FIG. 1. The cooling plate 2 includes a bottom plate 2a contacting bottom surfaces of all of the secondary battery cells 1, and a plurality of cooling fins 2b extending perpendicularly from the bottom surface 2a to increase a heat dissipation area.

In the related art, cooling air is supplied to the bottom of the battery module to contact the cooling plate 2, and thus, the cooling air absorbs heat of each of the secondary battery cells 1 using the cooling plate 2 as a heat transfer medium to cool the secondary battery cells 1.

However, because the secondary battery cells 1 are usually densely arranged inside a module case 3, heat exchange occurs between adjacent secondary battery cells 1, which causes a temperature difference between the secondary battery cells located at outer positions and the secondary battery cells located at inner positions. It is difficult to resolve the temperature difference between the secondary battery cells 1 by using the cooling plate 2 of the related art. Also, because the cooling air flows in one direction while absorbing the heat, a temperature of a rear portion of the cooling plate 2 is higher than that of a front portion of the cooling plate 2, and thus, it is more difficult to rapidly cool the secondary battery cells 1 with no cooling deviation.

DISCLOSURE

Technical Problem

The present disclosure is designed to solve the problems of the related art, and therefore the present disclosure is directed to applying a cooling structure capable of reducing a temperature deviation of each battery cell during cooling and further improving cooling efficiency to a battery module.

However, technical problems to be solved by the present disclosure are not limited to the above-described technical problems and one of ordinary skill in the art will understand other technical problems from the following description.

Technical Solution

In one aspect of the present disclosure, there is provided a battery module including: cylindrical battery cells arranged in horizontal and vertical directions, with a top cap facing upward; a module case in which the cylindrical battery cells are accommodated; and cooling caps mounted on lower end portions of the cylindrical battery cells, wherein the cooling caps protrude below a lower end of the module case to contact cooling air in a lower portion of the module case, and protrude to have different heights for pre-determined zones according to positions of the cylindrical battery cells located inside the module case.

Each of the cooling caps may include: a receiving portion into which a lower end portion of the cylindrical battery cell is inserted; and a heat dissipation portion extending downward from the receiving portion.

The cooling caps may include: a first cooling cap including the heat dissipation portion that is divided to have a plurality of fins; a second cooling cap including the heat dissipation portion that is shorter than the heat dissipation portion of the first cooling cap; a third cooling cap including the heat dissipation portion that is longer than the heat dissipation portion of the second cooling cap and shorter than the heat dissipation portion of the first cooling cap; and a fourth cooling cap including the heat dissipation portion that has a same length as the heat dissipation portion of the first cooling cap.

The pre-determined zones may include: a first zone on a left side; a third zone on a right side; and a second zone between the first zone and the third zone, which are divided in a left-right width direction of the module case, wherein the second cooling cap, the third cooling cap, and the fourth cooling cap are mounted, from the front of the module case, on the cylindrical battery cells located in the first zone and the third zone, and the first cooling cap is mounted on the cylindrical battery cells located in the second zone.

The first zone may include: a $1\_1^{th}$ zone of a front portion; a $1\_2^{th}$ zone of a middle portion; and a $1\_3^{th}$ zone of a rear portion, which are divided in a front-rear width direction of the module case.

The third zone may include: a $3\_1^{th}$ zone of a front portion; a $3\_2^{th}$ zone of a middle portion; and a $3\_3^{th}$ zone of a rear portion, which are divided in the front-rear width direction of the module case, wherein the second cooling cap is mounted on the cylindrical battery cells located in the $1\_1^{th}$ zone and the $3\_1^{th}$ zone, the third cooling cap is mounted on the cylindrical battery cells located in the $1\_2^{th}$ zone and the 3_2$^{th}$ zone, and the fourth cooling cap is mounted on the cylindrical battery cells located in the 1_3$^{th}$ zone and the 3_3$^{th}$ zone.

The first zone and the third zone may be symmetric to each other with respect to the second zone.

The cooling caps may be formed of aluminum (Al), copper (Cu), or graphite.

At least one of the cooling caps may be provided so that the heat dissipation portion has a pillar shape having a plurality of holes or a lattice structure.

The module case may include a lower frame and an upper frame vertically coupled to each other with the cylindrical battery cells therebetween, wherein the cooling caps protrude below a bottom surface of the lower frame, wherein the upper frame includes: an upper plate portion covering upper portions of the cylindrical battery cells and including a hole at a position corresponding to the top cap of each cylindrical battery cell; and bus bars extending straight in a front-rear direction of the module case from the upper plate portion and spaced apart from one another by a certain interval in a left-right width direction of the module case, wherein the top caps and upper ends of battery cans of the cylindrical battery cells are connected to the bus bars in a pre-determined pattern by metal wires.

The upper frame may further include partition plates each protruding upward between a (+) metal wire from the top cap and a (−) metal wire from the upper end of the battery can.

In another aspect of the present disclosure, there is also provided a battery pack including the battery module.

Advantageous Effects

According to an aspect of the present disclosure, a battery module having a cooling structure capable of reducing a temperature deviation of each battery cell during cooling and further improving cooling efficiency may be provided.

The effects of the present disclosure are not limited to the effects mentioned above, and other effects not mentioned will be clearly understood by one of ordinary skill in the art from the specification and the attached drawings.

DESCRIPTION OF DRAWINGS

FIGS. 3(*a*) and 3(*b*) are cut-away views illustrating a circular cylindrical battery cell on which a cooling cap is mounted according to an embodiment of the present disclosure.

FIGS. 9(*a*) and 9(*b*) are views illustrating modification examples of a cooling cap.

DETAILED DESCRIPTION

Hereinafter, embodiments of the present disclosure will be described with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the present disclosure, so it should be understood that other equivalents and modifications could be made thereto without departing from the scope of the present disclosure. These embodiments are provided so that this disclosure will be thorough and complete, and will fully convey the scope of the disclosure to one of ordinary skill in the art. Accordingly, the thickness and size of each element shown in the drawings may be exaggerated, omitted or schematically drawn for the purpose of clarity. Accordingly, the size of each element does not utterly reflect an actual size or ratio.

Figure 2:
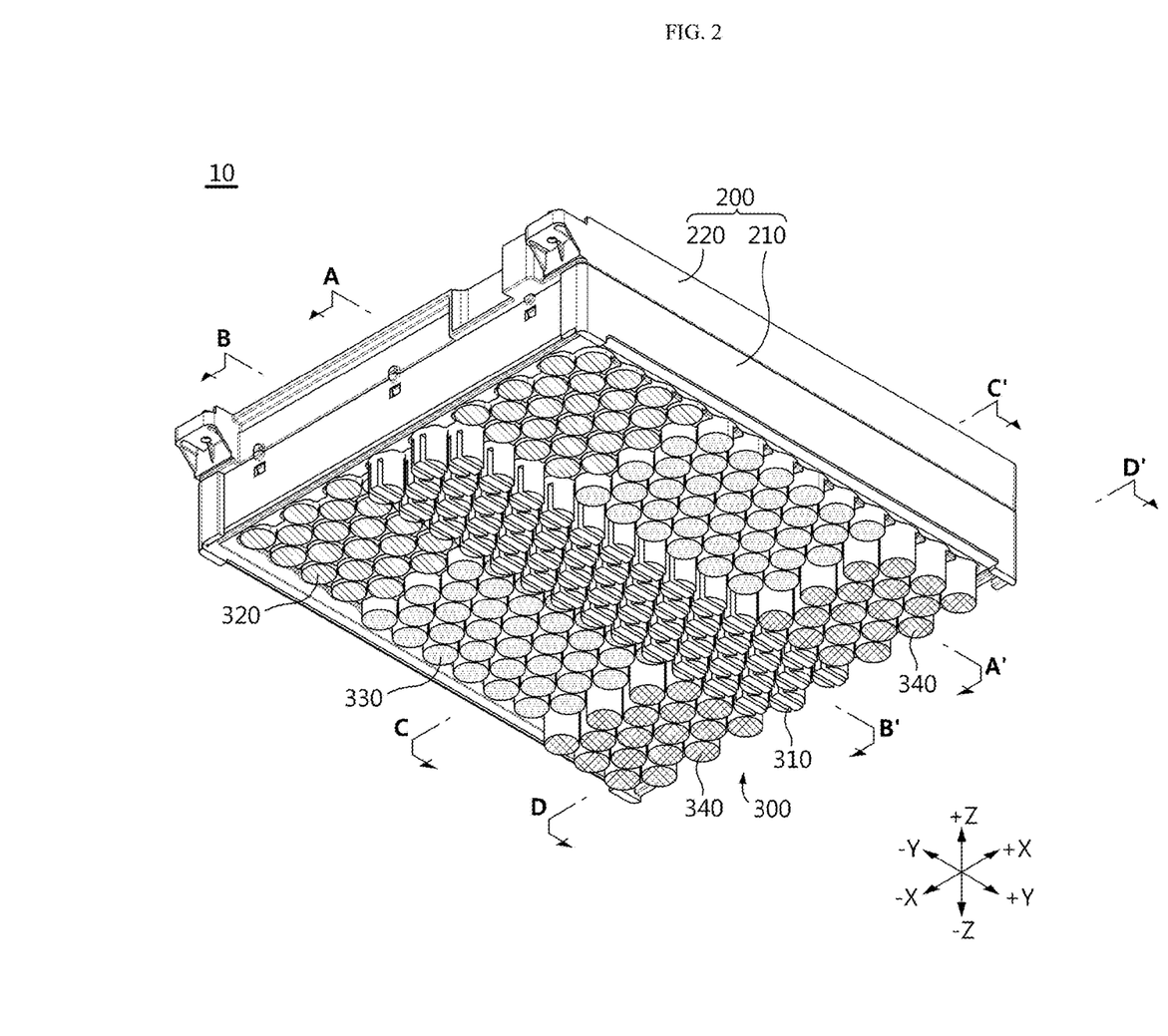
FIG. 2 is a perspective view illustrating a battery module, when viewed from the bottom, according to an embodiment of the present disclosure.
Figure 3A:
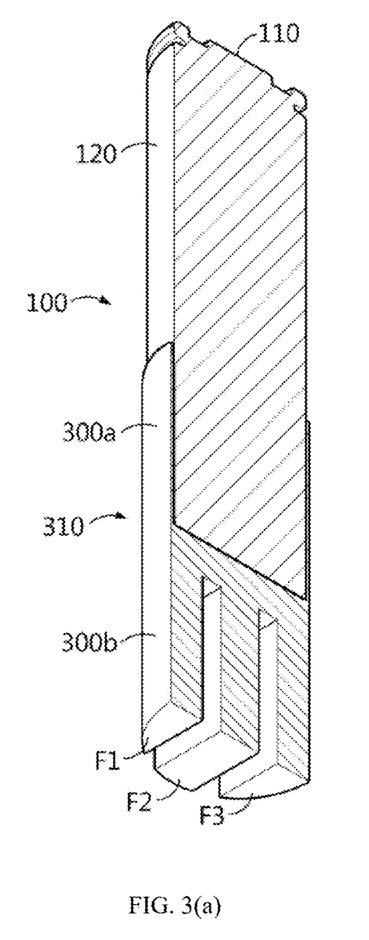
Figure 3B:
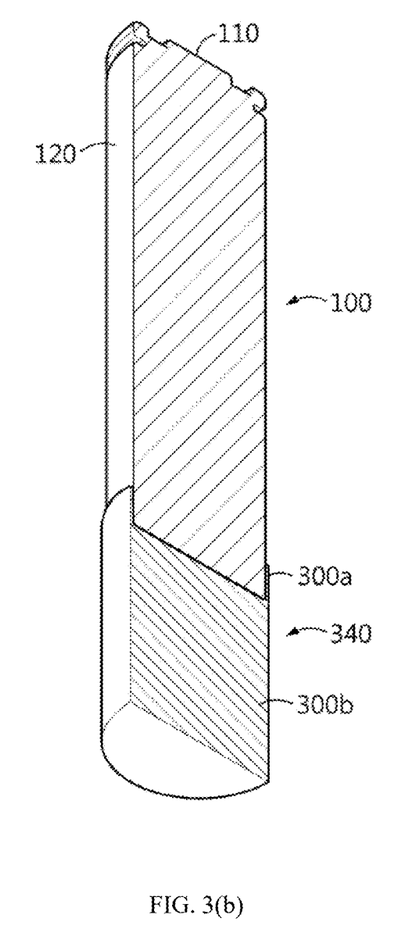
Figure 4:
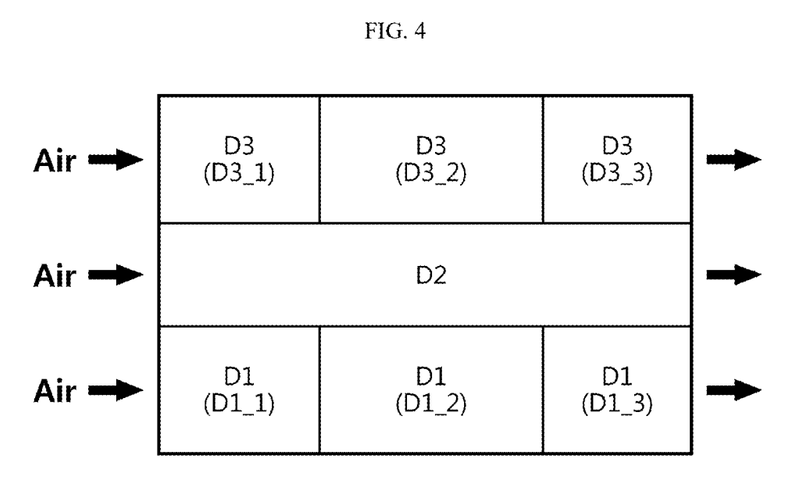
FIG. 4 is a view illustrating that a bottom of the battery module of FIG. 2 is divided into several zones.
Figure 5:
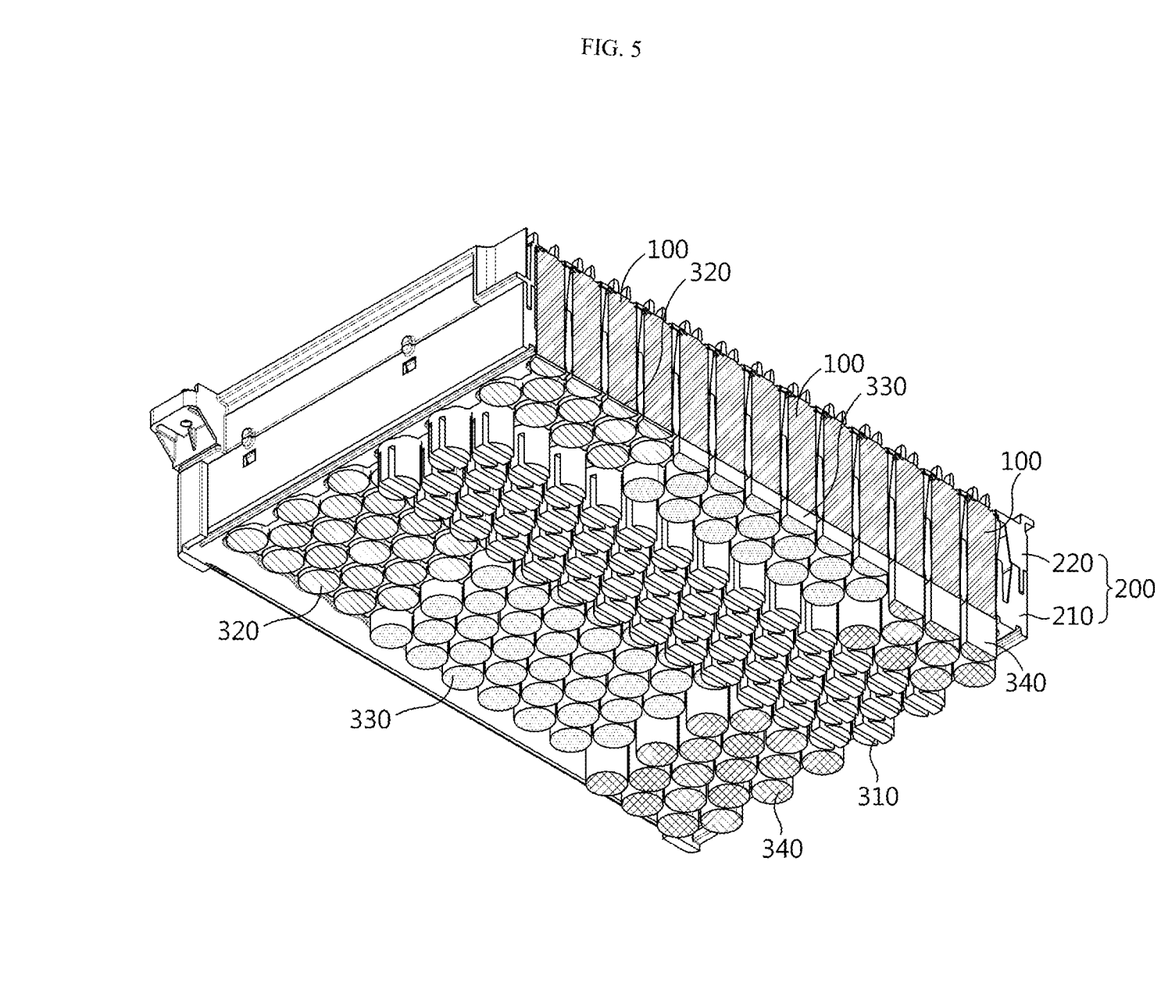
FIG. 5 is a cross-sectional view illustrating the battery module taken along line A-A' of FIG. 2.
Figure 6:
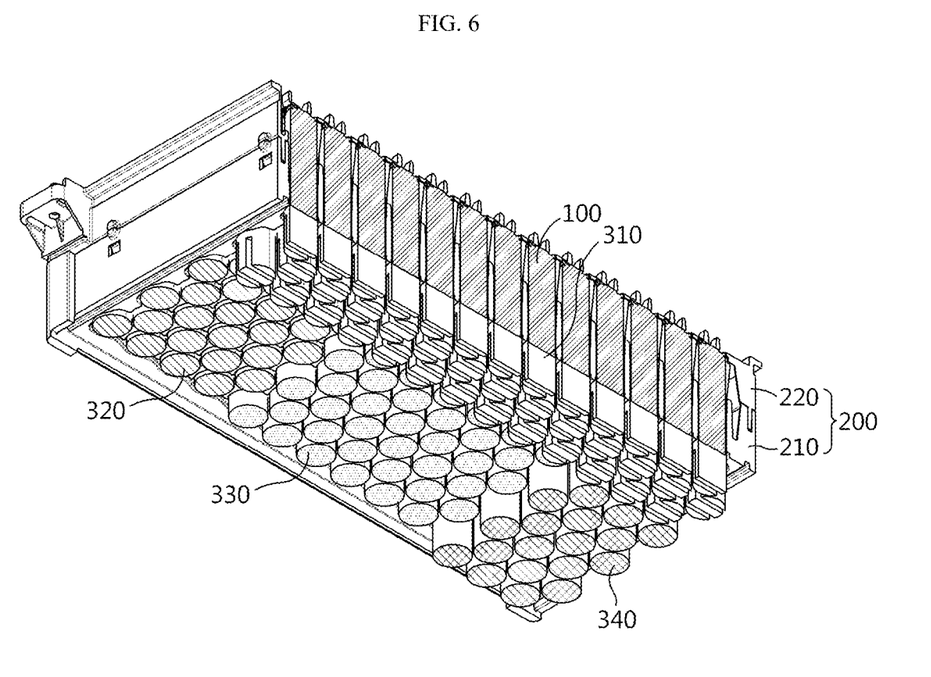
FIG. 6 is a cross-sectional view illustrating the battery module taken along line B-B' of FIG. 2.
Figure 7:
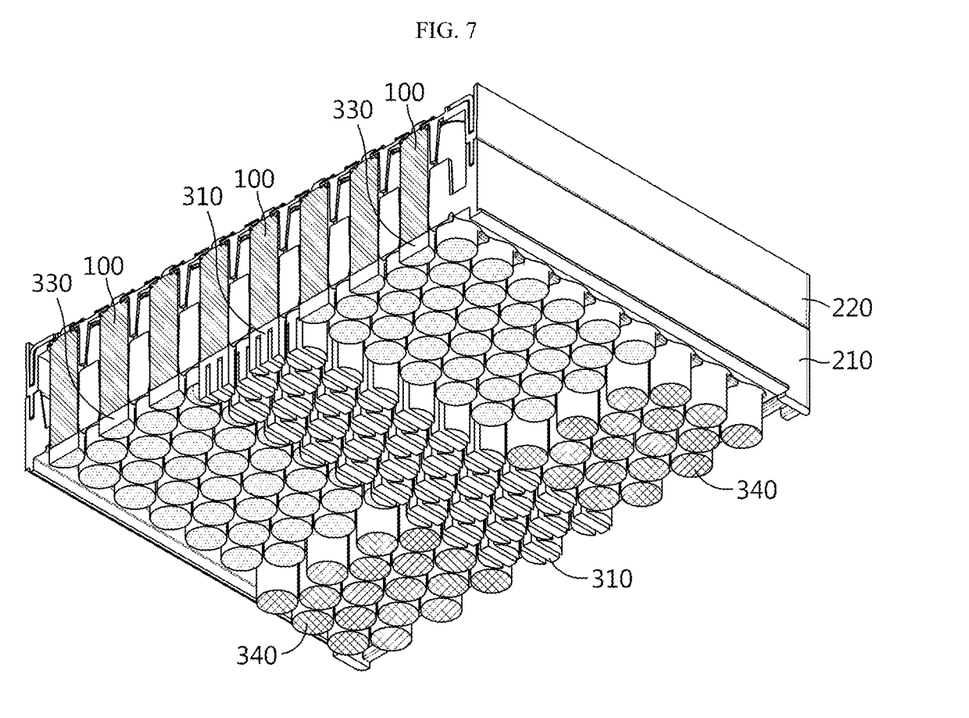
FIG. 7 is a cross-sectional view illustrating the battery module taken along line C-C' of FIG. 2.
Figure 8:
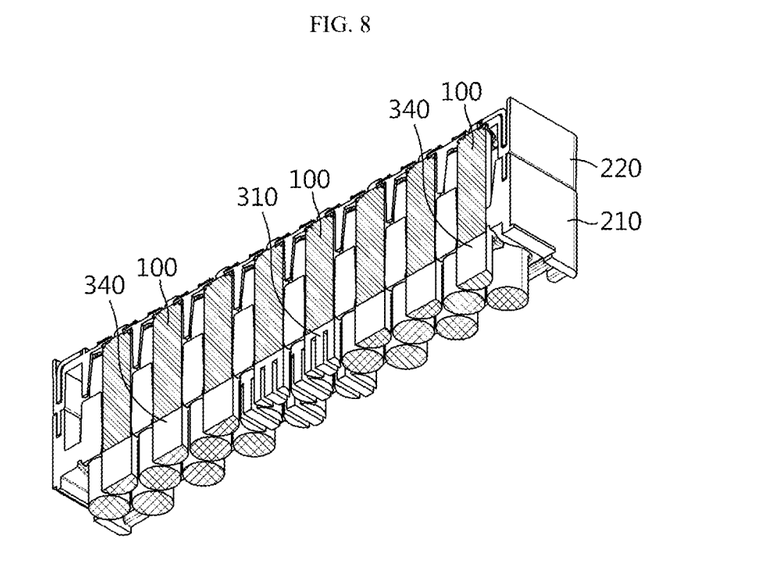
FIG. 8 is a cross-sectional view illustrating the battery module taken along line D-D' of FIG. 2.

FIG. 2 is a perspective view illustrating a battery module, when viewed from the bottom, according to an embodiment of the present disclosure. FIGS. 3(*a*) and 3(*b*) are cut-away views illustrating a cylindrical battery cell on which a cooling cap is mounted according to an embodiment of the present disclosure. FIG. 4 is a view illustrating that a lower portion of the battery module of FIG. 2 is divided into several zones.

Referring to FIGS. 2 through 4, a battery module 10 according to an embodiment of the present disclosure includes cylindrical battery cells 100, a module case 200, and cooling caps 300.

The battery module 10 according to the present disclosure may include the cylindrical battery cells 100. The cylindrical battery cell 100 is a can-type secondary battery in which an electrode assembly is embedded in a metal can. Although not shown in detail, the cylindrical battery cell 100 may include a cylindrical battery can 120, an electrode assembly, and a top cap 110, and may be manufactured by putting an electrolyte and the electrode assembly in the battery can 120, locating the top cap 110 at an upper open end of the battery can 120, and sealing the battery can 120 by crimping an uppermost end of the battery can 120.

The electrode assembly of the cylindrical battery cell 100 is a jelly-roll type electrode assembly with a separator located between a positive electrode and a negative electrode, and a positive electrode tab is attached to the positive electrode and is connected to the top cap 110, and a negative electrode tab is attached to the negative electrode and is connected to a lower end of the battery can 120. Accordingly, in the typical cylindrical battery cell 100, the top cap 110 functions as a positive electrode terminal and the battery can 120 functions as a negative electrode terminal.

For reference, although the battery module 10 is configured by applying the cylindrical battery cell 100 in the present embodiment, the battery module 10 may be configured by applying a prismatic battery cell, instead of a cylindrical battery cell. In this case, the cooling cap 300 described below is deformed to be fitted around the prismatic battery cell.

The cylindrical battery cells 100 may be connected in series and/or in parallel according to the output and capacity required for the battery module 10. For example, a pre-set number of cylindrical battery cells 100 may be accommodated in horizontal and vertical directions inside the module case 200 with the top cap 110 facing upward, and the cylindrical battery cells 100 may be arranged in series and/or in parallel by connecting the top cap 110 of each cylindrical battery cell 100 or an upper end of the battery can 120 to a metal bar-shaped bus bar 223 by using a wire, which will be described below in more detail.

The module case 200 is a structure in which the cylindrical battery cells 100 are accommodated, and protects the cylindrical battery cells 100 from external impact, vibration, or the like. The module case 200 of the present disclosure includes a lower frame 210 and an upper frame 220 provided to be vertically coupled to each other with the cylindrical battery cells 100 therebetween.

The lower frame 210 may include four side portions in front, rear, left, and right directions, a lower plate portion forming a bottom surface, and an open upper portion. The lower plate portion may include holders for fixedly supporting the cylindrical battery cells 100, and holes for protruding the cooling caps 300 mounted on lower end portions of the cylindrical battery cells 100 below the lower plate portion.

The upper frame 220 may include four side portions in front, rear, left, and right directions, an upper plate portion 221 covering uppermost ends of the cylindrical battery cells 100, and an open lower portion.

For easy attachment and detachment of the upper frame 220 and the lower frame 210, hooks may be provided on the front and rear side portions of the upper frame 220, and hook holes into which the hooks may be inserted may be provided in the front and rear side portions of the lower frame 210.

The cylindrical battery cells 100 may be arranged in the horizontal (±X axis) and vertical (±Y axis) directions inside the module case 200 with the top cap 110 facing upward, and the cylindrical battery cells 100 may be fixedly supported by the holders inside the module case 200.

The cooling caps 300 are means for effectively dissipating heat generated in the cylindrical battery cells 100, and are respectively mounted on lower end portions of the cylindrical battery cells 100. Portions of the cooling caps 300 are exposed to a flow path of cooling air supplied horizontally in a lower portion of the module case 200 to dissipate heat of the cylindrical battery cells 100 by using the cooling air. In this case, the cylindrical battery cells 100 may be individually cooled through the cooling caps 300 respectively mounted on the cylindrical battery cells 100.

Also, the cooling caps 300 may protrude below a lower end of the module case 200 to have different heights for pre-determined zones according to positions of the cylindrical battery cells 100 located inside the module case 200.

That is, the same cooling cap 300 is not applied to all of the battery cells 100, in the battery module 10 according to the present disclosure. Different cooling caps 300 for pre-determined zones may be applied according to positions of the cylindrical battery cells 100 located inside the module case 200.

In detail, the cooling caps 300 of the present embodiment include a first cooling cap 310, a second cooling cap 320, a third cooling cap 330, and a fourth cooling cap 340 as shown in FIG. 2.

A common feature of the cooling caps 300 will be first described and then a difference therebetween will be described.

The cooling caps 300 are formed of a material having excellent thermal conductivity such as aluminum (Al), copper (Cu), or graphite, and commonly include a receiving portion 300a and a heat dissipation portion 300b as shown in FIGS. 3(a) and 3(b). For reference, an insulating sheet may be coated around the battery can 120, to secure insulation between the cylindrical battery cell 100 and the cooling cap 300 formed of a metal material.

A lower end portion of the cylindrical battery cell 100 may be inserted into the receiving portion 300a, and the receiving portion 300a may surround a part of an outer circumferential surface and a bottom surface of the cylindrical battery cell 100.

When compared to a cooling plate 2 (see FIG. 1) of the related art which contacts only a bottom surface of the cylindrical battery cell 100, the receiving portion 300a of the cooling cap 300 may advantageously increase conductive heat dissipation effect between the cooling cap 300 and the cylindrical battery cell 100.

The heat dissipation portion 300b extends downward from the receiving portion 300a to maximize convective heat dissipation effect. The heat dissipation portion 300b may protrude below the lower end of the module case 200 to contact cooling air.

A difference between the first cooling cap 310 through the fourth cooling cap 340 lies in a length or a shape of the receiving portion 300a or the heat dissipation portion 300b.

Conductive heat dissipation occurs well when a contact area between objects is large. Accordingly, the conductive heat dissipation performance of each cooling cap 300 may be different by reducing or increasing a length of the receiving portion 300a contacting the cylindrical battery cell 100. Convective heat dissipation occurs well when the area of an object exposed to air is large. Accordingly, the convective heat dissipation performance of each cooling cap 300 may be different by increasing or reducing a heat dissipation area by changing a length or a shape of the heat dissipation portion 300b exposed to air.

That is, the first cooling cap 310 through the fourth cooling cap 340 may have different heat dissipation performance by differently configuring at least one of the receiving portion 300a and the heat dissipation portion 300b.

In detail, referring to FIGS. 3(a) and 3(b), when the first cooling cap 310 and the fourth cooling cap 340 are compared with each other, because the receiving portion 300a of the first cooling cap 310 is longer than the receiving portion 300a of the fourth cooling cap 340, an area surrounding the cylindrical battery cell 100 is larger.

Also, in the first cooling cap 310 and the fourth cooling cap 340, lengths of the heat dissipation portions 300b are the same but shapes of the heat dissipation portions 300b are different. The heat dissipation portion 300b of the first cooling cap 310 has a shape in which a body is divided to have a plurality of fins F1, F2, F3, the heat dissipation portion 300b of the fourth cooling cap 340 has a simple cylindrical shape, and thus, a heat dissipation area contacting air of the heat dissipation portion 300b of the first cooling cap 310 is larger than that of the heat dissipation portion 300b of the fourth cooling cap 340.

Accordingly, during air cooling, the cylindrical battery cell 100 using the first cooling cap 310 may more smoothly discharge heat into air than the cylindrical battery cell 100 using the fourth cooling cap 340.

Although not shown in FIGS. 3(a) and 3(b), when the second cooling cap 320 and the third cooling cap 330 are compared with the fourth cooling cap 340, the receiving portion 300a is the same and there is a difference in a length of the heat dissipation portion 300b. From among the three cooling caps 300, a length of the heat dissipation portion 300b of the second cooling cap 320 is the shortest and a length of the heat dissipation portion 300b of the third cooling cap 330 is the next shortest.

In other words, from among the four cooling caps 300 of the present disclosure, the first cooling cap 310 includes the receiving portion 300a that is relatively long compared to the other ones and includes the heat dissipation portion 300b including the plurality of fins F1, F2, F3. The first cooling cap 310 and the fourth cooling cap 340 have the longest heat dissipation portion 300b, the second cooling cap 320 is the shortest, and the third cooling cap 330 is longer than the second cooling cap 320 and is shorter than the first cooling cap 310 or the fourth cooling cap 340.

Accordingly, the heat dissipation performance of the cooling caps 300 is good in the order of the first cooling cap 310>the fourth cooling cap 340>the third cooling cap 330>the second cooling cap 320.

As such, because the cooling caps 300 having different heat dissipation performance are mounted on the cylindrical battery cells 100 for pre-determined zones, a cooling temperature difference according to positions of the cylindrical battery cells 100 during air cooling may be reduced.

The pre-determined zones may be determined by analyzing a temperature distribution for each zone of the battery module 10 during charging/recharging of the battery module 10 in a state where a cooling device is not driven, and a temperature change for each zone of cooling air flowing along a lower end of the module case 200 during air cooling.

Referring to FIGS. 2 and 4, the pre-determined zones may include a first zone D1, a second zone D2, and a third zone D3 divided from left to right in a left-right width direction (±Y axis direction) of the module case 200. The second zone D2 is located between the first zone D1 and the second zone D2 and extends from the front to the rear of the module case 200, the first zone D1 is a left area of the module case 200 extending from the front to the rear of the module case 200, and the third zone D3 is a right area of the module case 200 extending from the front to the rear of the module case 200. The first zone D1 and the third zone D3 are symmetric to each other with respect to the second zone D2.

Each of the first zone D1 and the third zone D3 may be divided into three zones. Each zone is divided by considering a flow direction of cooling air, and it is assumed that cooling air enters from the front of the battery module 10, horizontally flows along a lower portion of the module case 200, and exits to the rear of the battery module 10.

The first zone D1 may be divided into a $1\_1^{th}$ zone D1_1 of a front portion, a $1\_2^{th}$ zone D1_2 of a middle portion, and a $1\_3^{th}$ zone D1_3 of a rear portion in a front-rear width direction (±Y axis direction) of the module case 200, and the third zone D3 may be divided into a $3\_1^{th}$ zone D3_1 of a front portion, a $3\_2^{th}$ zone D3_2 of a middle portion, and a $3\_3^{th}$ zone D3_3 of a rear portion in the front-rear width direction of the module case 200.

As shown in FIGS. 2, 4 through 8, in order to reduce a temperature deviation between the cylindrical battery cells 100 of the seven zones, four types of cooling caps 300 are used.

In a temperature distribution of the battery module 10 to which the cylindrical battery cells 100 are applied, a heat island phenomenon in which a temperature of a middle region is high and a temperature of an edge region is low is observed. In order to solve the heat island phenomenon, it is necessary to increase the cooling efficiency of the second zone D2 corresponding to a middle portion to be higher than that of the first zone D1 or the third zone D3.

Accordingly, the first cooling caps 310 are mounted on the cylindrical battery cells 100 located at a position corresponding to the second zone D2. For reference, although the first cooling caps 310 are applied to all of the second zone D2, for example, when a size of the battery module 10 is larger than that of the present embodiment, the second zone D2 may be sub-divided and the first cooling caps 310 having different lengths may be applied to the sub-divided zones.

The second cooling caps 320, the third cooling caps 330, and the fourth cooling caps 340 are mounted, from the front of the module case 200, on the cylindrical battery cells 100 located in the first zone D1 and the third zone D3.

Because cooling air flows from the front to the back along a lower portion of the module case 200 to absorb heat, a temperature of air at the rear is relatively high and a flow velocity and a flow rate tend to be reduced toward the rear. In order to compensate for the temperature deviation, the $1\_1^{th}$ zone D1_1 uses the second cooling cap 320, the $1\_2^{th}$ zone D1_2 uses the third cooling cap 330 having better heat dissipation performance than the $1\_1^{th}$ zone D1_1, and the $1\_3^{th}$ zone D1_3 uses the fourth cooling cap 340 having better heat dissipation performance than the $1\_2^{th}$ zone D1_2. Regarding the third zone D3, for the same reason as that of the first zone D1, the $3\_1^{th}$ zone D3_1 uses the second cooling cap 320, the $3\_2^{th}$ zone D3_2 uses the third cooling cap 330, and the $3\_3^{th}$ zone D3_3 uses the fourth cooling cap 340.

Although the pre-determined zones are seven zones in the present embodiment, this is merely an example, and the pre-determined zones may be determined to be more or less than seven zones according to a size or a structure of the battery module 10 or a flow direction of cooling air, and an average temperature may be reduced by reducing a temperature deviation by increasing or reducing a cooling portion of the cylindrical battery cell 100 in a corresponding zone.

As such, because the battery module 10 according to the present disclosure individually cools the cylindrical battery cells 100 by using multiple cooling caps 300, when compared to the related art (see FIG. 1), the cylindrical battery cells 100 may be rapidly cooled and a temperature deviation may be managed for each zone.

Figure 9A:
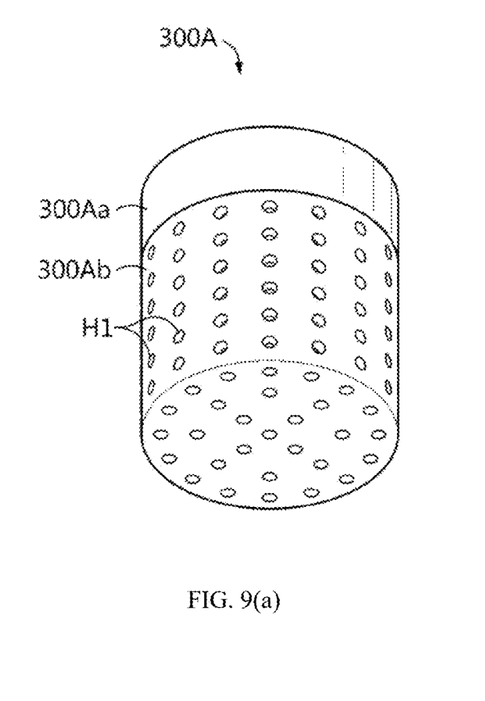
Figure 9B:
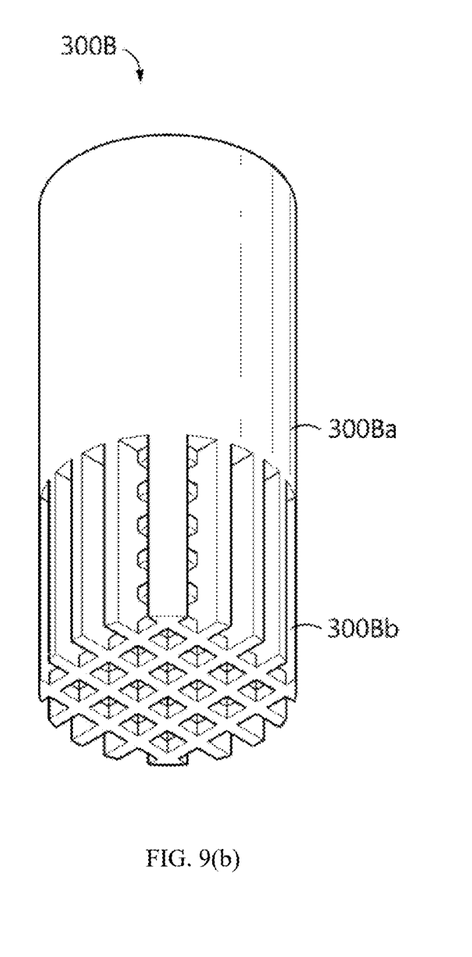

FIGS. 9(a) and 9(b) are views illustrating different types of cooling caps 300A, 300B according to the present disclosure.

In the cooling cap 300A of FIG. 9(a), a receiving portion 300Aa is short, but a plurality of holes H1 are formed in a heat dissipation portion 300Ab to increase a heat dissipation area and improve ventilation. In the cooling cap 300B of FIG. 9(b), a receiving portion 300Ba extends to half a height of the cylindrical battery cell 100 to maximize conductive heat dissipation effect and convective heat dissipation effect and a three-dimensional lattice structure is formed in a heat dissipation portion 300Bb.

As such, the cooling cap 300 may have different heat dissipation performance by variously modifying a length and a shape of the receiving portion 300a or the heat dissipation portion 300b.

Figure 10:
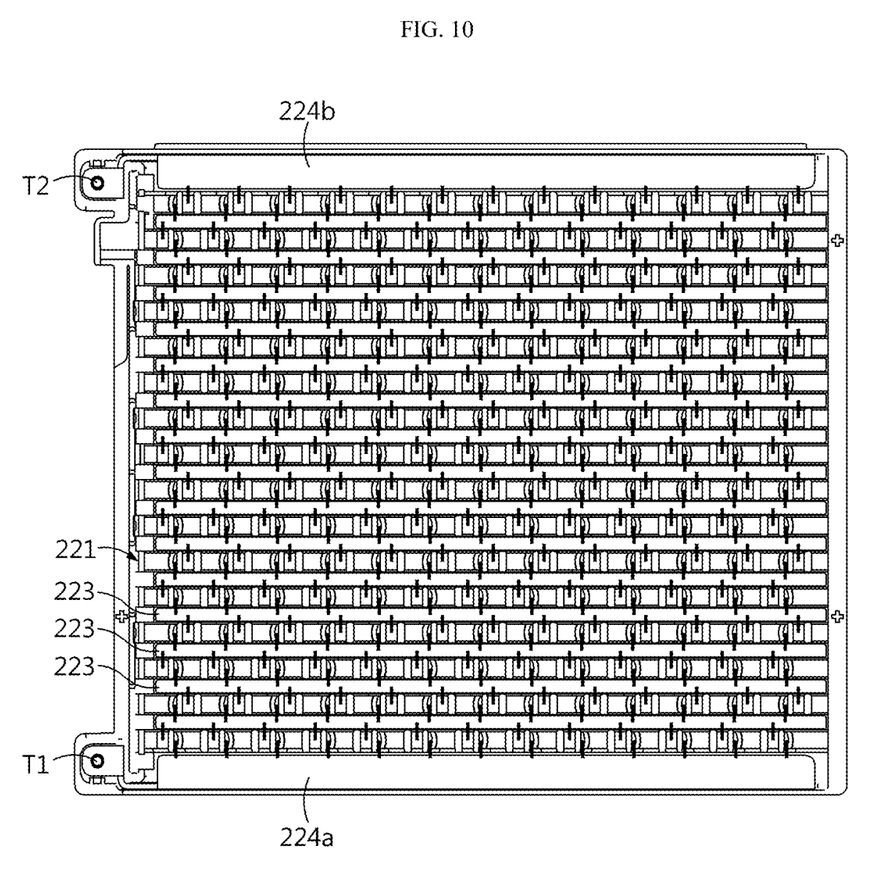
FIG. 10 is a plan view illustrating a battery module according to an embodiment of the present disclosure.
Figure 11:
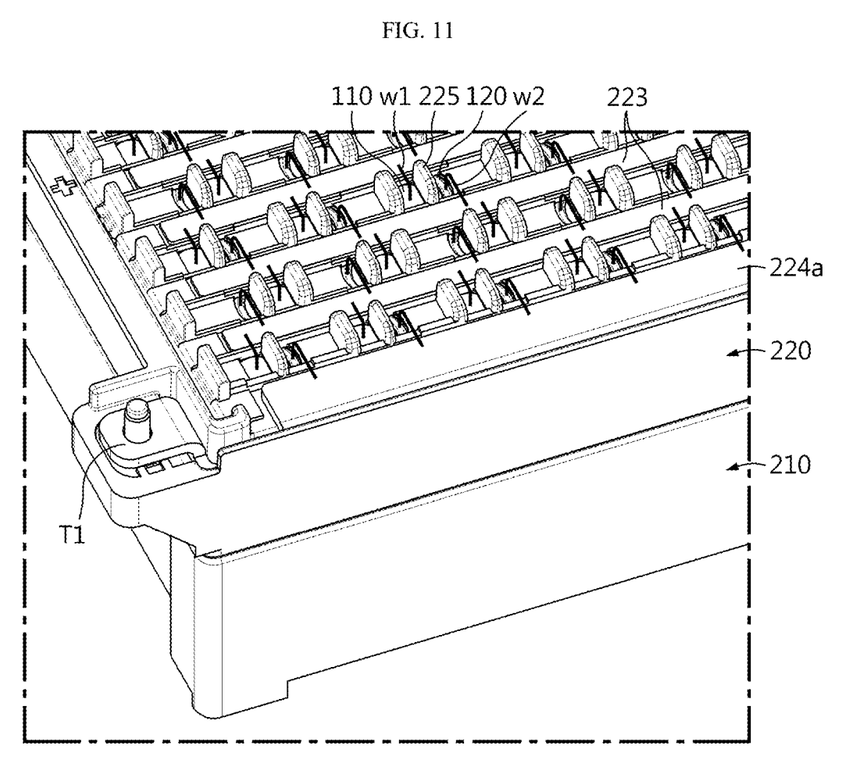
FIG. 11 is a partial enlarged perspective view of FIG. 10.

FIG. 10 is a plan view illustrating the battery module 10 according to an embodiment of the present disclosure. FIG. 11 is a partial enlarged perspective view of FIG. 10.

Next, a configuration of the upper frame 220 of the battery module 10 and a connection configuration of the cylindrical battery cells 100 according to an embodiment of the present disclosure will be briefly described with reference to FIGS. 10 and 11.

As shown in FIG. 10, all of the cylindrical battery cells 100 are located upright with the top cap 110 facing upward, and are accommodated in the module case 200 in a horizontal or vertical direction.

The upper plate portion 221 of the upper frame 220 has a small hole at a position corresponding to the top cap 110 of the cylindrical battery cell 100. A middle portion of the top cap 110 and an uppermost end of the battery can 120 may be seen under the hole.

A plurality of bus bars 223 are located on a top surface of the upper plate portion 221. Each bus bar 223 has a long band shape and extends straight in a front-rear direction of the module case 200, and the bus bars 223 are spaced apart from one another between the cylindrical battery cells 100 in a left-right direction of the module case 200. A leftmost bus bar 224a in the drawing may be integrally formed with a positive electrode terminal T1 of the battery module 10, and a rightmost bus bar 224b may be integrally formed with a negative electrode terminal T2 of the battery module 10. The cylindrical battery cells 100 are connected to one another in series and/or in parallel as the top caps 110 and upper ends of the battery cans 120 are connected to the bus bars 223 in a pre-determined pattern by using metal wires.

That is, as shown in FIG. 11, for example, in each of the cylindrical battery cells 100 in a first column adjacent to a leftmost bus bar 223, an upper end of the battery can 120 is connected to the leftmost bus bar 223 by using a (−) metal wire W2, and the top cap 110 is connected to an adjacent second bus bar 223 by using a (+) metal wire W1. In each of the cylindrical battery cells 100 in a second column, an upper end of the battery can 120 is connected to the second bus bar 223 by using a (−) metal wire W2, and the top cap 110 is connected to an adjacent third bus bar 223 by using a (+) metal wire W1. In this pattern, when metal wire bonding is performed up to a rightmost bus bar 223, the cylindrical battery cells 100 in the same column are connected in parallel, and the cylindrical batteries 100 in different columns are connected in series.

The upper plate portion 221 includes partition plates 225. Each of the partition plates 225 protrudes upward between the (+) metal wire W1 from the top cap 110 and the (−) metal wire W2 from the upper end of the battery can 120. When wire bonding is performed, the partition plate 225 may reduce the risk of short circuit between metal wires and, even when a metal body unexpectedly falls on the upper plate portion 221, may prevent simultaneous contact with the (+) metal wire W1 and the (−) metal wire W2.

A battery pack according to the present disclosure may include one or more battery modules according to the present disclosure. Also, the battery pack according to the present disclosure may further include, in addition to the battery modules, a pack case for accommodating the battery modules, and various devices for controlling charging and discharging of each battery module, for example, a battery management system (BMS), a current sensor, and a fuse.

The battery module according to the present disclosure may be applied to a vehicle such as an electric vehicle or a hybrid vehicle, or an energy storage system (ESS).

While one or more embodiments of the present disclosure have been described with reference to the embodiments and figures, the present disclosure is not limited thereto, and it will be understood by one of ordinary skill in the art that various changes in form and details may be made therein without departing from the scope of the present disclosure as defined by the following claims.

It will be understood by one of ordinary skill in the art that when terms indicating directions such as upper, lower, left, right, front, and rear are used, these terms are only for convenience of explanation and may vary according to a position of a target object, a position of an observer, and so on.

What is claimed is:

1. A battery module, comprising:
   cylindrical battery cells arranged in horizontal and vertical directions, each cylindrical battery cell having a top cap facing upward;
   a module case in which the cylindrical battery cells are accommodated; and
   cooling caps mounted on lower end portions of the cylindrical battery cells,
   wherein the cooling caps
   protrude below a lower end of the module case to contact cooling air in a lower portion of the module case, and protrude to have different heights for pre-determined zones according to positions of the cylindrical battery cells located inside the module case.

2. The battery module of claim 1, wherein each of the cooling caps comprises:
   a receiving portion into which a lower end portion of the cylindrical battery cell is inserted; and
   a heat dissipation portion extending downward from the receiving portion.

3. The battery module of claim 2, wherein the cooling caps comprise:
   a first cooling cap comprising the heat dissipation portion that is divided to have a plurality of fins;
   a second cooling cap comprising the heat dissipation portion that is shorter than the heat dissipation portion of the first cooling cap;
   a third cooling cap comprising the heat dissipation portion that is longer than the heat dissipation portion of the second cooling cap and shorter than the heat dissipation portion of the first cooling cap; and
   a fourth cooling cap comprising the heat dissipation portion that has a same length as the heat dissipation portion of the first cooling cap.

4. The battery module of claim 3, wherein the pre-determined zones comprise:
   a first zone on a left side; a third zone on a right side; and a second zone between the first zone and the third zone, which are divided in a left-right width direction of the module case,
   wherein the second cooling cap, the third cooling cap, and the fourth cooling cap are mounted, from a front of the module case, on the cylindrical battery cells located in the first zone and the third zone, and
   the first cooling cap is mounted on the cylindrical battery cells located in the second zone.

5. The battery module of claim 4, wherein the first zone comprises:
   a $1\_1^{th}$ zone of a front portion; a $1\_2^{th}$ zone of a middle portion; and a $1\_3^{th}$ zone of a rear portion, which are divided in a front-rear width direction of the module case, and
   the third zone comprises:
   a $3\_1^{th}$ zone of a front portion; a $3\_2^{th}$ zone of a middle portion; and a $3\_3^{th}$ zone of a rear portion, which are divided in the front-rear width direction of the module case, wherein the second cooling cap is mounted on the cylindrical battery cells located in the $1\_1^{th}$ zone and the $3\_1^{th}$ zone, the third cooling cap is mounted on the cylindrical battery cells located in the $1\_2^{th}$ zone and the $3\_2^{th}$ zone, and the fourth cooling cap is mounted on the cylindrical battery cells located in the $1\_3$th zone and the $3\_3^{th}$ zone.

6. The battery module of claim 4, wherein the first zone and the third zone are symmetric to each other with respect to the second zone.

7. The battery module of claim 1, wherein the cooling caps are formed of aluminum (Al), copper (Cu), or graphite.

8. The battery module of claim 2, wherein at least one of the cooling caps is provided so that the heat dissipation portion has a pillar shape having a plurality of holes or a lattice structure.

9. The battery module of claim 1, wherein the module case comprises a lower frame and an upper frame vertically coupled to each other with the cylindrical battery cells therebetween, wherein the cooling caps protrude below a bottom surface of the lower frame, wherein the upper frame comprises:

an upper plate portion covering upper portions of the cylindrical battery cells and comprising a hole at a position corresponding to the top cap of each cylindrical battery cell; and bus bars extending straight in a front-rear direction of the module case from the upper plate portion and spaced apart from one another by a certain interval in a left-right width direction of the module case, wherein the top caps and upper ends of battery cans of the cylindrical battery cells are connected to the bus bars in a pre-determined pattern by metal wires.

10. The battery module of claim 9, wherein the upper frame further comprises partition plates each protruding upward between a (+) metal wire from the top cap and a (−) metal wire from the upper end of the battery can.

11. A battery pack, comprising the battery module according to claim 1.

* * * * *